(12) United States Patent
Yokoyama et al.

(10) Patent No.: US 11,892,708 B2
(45) Date of Patent: Feb. 6, 2024

(54) STEREOSCOPIC OPTICAL SYSTEM AND IMAGE PICKUP APPARATUS

(71) Applicant: CANON KABUSHIKI KAISHA, Tokyo (JP)

(72) Inventors: Takayoshi Yokoyama, Tochigi (JP); Kentaro Mori, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 181 days.

(21) Appl. No.: 17/560,655

(22) Filed: Dec. 23, 2021

(65) Prior Publication Data
US 2022/0221688 A1 Jul. 14, 2022

(30) Foreign Application Priority Data
Jan. 14, 2021 (JP) ................. 2021-004230

(51) Int. Cl.
*G02B 9/12* (2006.01)
*H04N 13/207* (2018.01)
*G02B 13/18* (2006.01)
*G02B 5/00* (2006.01)

(52) U.S. Cl.
CPC ............. *G02B 9/12* (2013.01); *H04N 13/207* (2018.05); *G02B 5/005* (2013.01); *G02B 13/18* (2013.01)

(58) Field of Classification Search
CPC .......... G02B 9/12; G02B 5/005; G02B 13/18; H04N 13/207
USPC .......................................... 359/462, 466, 464
See application file for complete search history.

(56) References Cited

U.S. PATENT DOCUMENTS

| 8,976,271 | B2 | 3/2015 | Yokoyama et al. | |
| 9,977,220 | B2 | 5/2018 | Yokoyama et al. | |
| 10,527,825 | B2 | 1/2020 | Mori | |
| 11,092,780 | B2 | 8/2021 | Mori | |
| 2011/0310231 | A1* | 12/2011 | Yamaguchi | G03B 35/10 359/464 |
| 2013/0127997 | A1* | 5/2013 | Inomoto | H04N 13/20 348/46 |
| 2013/0278731 | A1* | 10/2013 | Inomoto | G03B 35/10 359/462 |
| 2016/0070094 | A1* | 3/2016 | Togino | G02B 23/2415 348/46 |

(Continued)

FOREIGN PATENT DOCUMENTS

JP 2020-8629 A 1/2020

*Primary Examiner* — William R Alexander
*Assistant Examiner* — Sharrief I Broome
(74) *Attorney, Agent, or Firm* — Carter, DeLuca & Farrell LLP

(57) ABSTRACT

A stereoscopic optical system includes two parallel optical systems that each include, in order from an object side to an image side, a front unit having a negative refractive power, an intermediate unit having two reflective surfaces, and a rear unit. A distance between optical axes of rear units is smaller than that between optical axes of front units in the two optical systems due to bending of an optical path by the two reflective surfaces. At least one of the intermediate unit and the rear unit has a positive refractive power. The front unit includes, in order from the object side to the image side, a first subunit consisting of one or more negative lenses disposed on the object side of a positive lens closest to an object in the front unit, and a second subunit having a positive power. A predetermined condition is satisfied.

15 Claims, 7 Drawing Sheets

(56) References Cited

U.S. PATENT DOCUMENTS

2020/0014908 A1\* 1/2020 Ebe ........................ H04N 23/54

\* cited by examiner

STEREOSCOPIC OPTICAL SYSTEM AND IMAGE PICKUP APPARATUS

BACKGROUND OF THE INVENTION

Field of the Invention

The present invention relates to a stereoscopic optical system and an image pickup apparatus suitable to capture a stereoscopic (three-dimensional) image.

Description of the Related Art

As an image pickup apparatus that can acquire a stereoscopic image by imaging, an image pickup apparatus is used in which two optical systems are disposed with a parallax with each other. Japanese Patent Laid-Open No. ("JP") 2020-8629 discloses an image pickup apparatus in which image circles of two fisheye lenses fall within a single image sensor.

It is said that a baseline length between the two optical systems should be set to or within the human eye width (about 60 to 65 mm) in order to acquire a realistic stereoscopic image. Since the image sensor is generally smaller than the human eye width, the image circles partially shift from the image sensor if the fisheye lenses are simply arranged. Accordingly, the image pickup apparatus disclosed in JP 2020-8629 houses the image circles of the two fisheye lenses within a single image sensor by arranging two reflective elements in each fisheye lens so as to bend the optical path.

JP 2020-8629 discloses examples with angles of view from 158° to 183°, but a wider angle of view is demanded for more realistic stereoscopic images.

However, the fisheye lens including two reflective elements needs a longer overall length to secure a space for the reflective elements. Therefore, a lens closest to an object and a lens closest to an image plane are separated from a diaphragm (aperture stop) and an outer diameter of the lens on the object side tends to be larger as the angle of view is increased. In order to reduce the outer diameter of the lens closest to the object, if a refractive power of a negative lens unit closest to the object including that lens is increased, an on-axis light ray is significantly diverged and enters the diaphragm and thus the diaphragm diameter becomes large.

SUMMARY OF THE INVENTION

The present invention provides a small stereoscopic optical system that can capture a stereoscopic image at a wide angle of view, and an image pickup apparatus having the same.

A stereoscopic optical system according to one aspect of the present invention includes two optical systems arranged in parallel. Each of the two optical systems includes, in order from an object side to an image side, a front unit having a negative refractive power, an intermediate unit having two reflective surfaces, and a rear unit. A distance between optical axes of rear units is smaller than a distance between optical axes of front units in the two optical systems due to bending of an optical path by the two reflective surfaces. At least one of the intermediate unit and the rear unit has a positive refractive power. The front unit includes, in order from the object side to the image side, a first subunit consisting of one or more negative lenses disposed on the object side of a positive lens closest to an object in the front unit, and a second subunit having a positive power. The following inequalities are satisfied:

$$0.20 \le f1A/f1 \le 0.42$$

$$0.61 \le |f3/f2| \le 0.90$$

where f1, f2, f3, and f1A are focal lengths of the front unit, the intermediate unit, the rear unit, and the first subunit for d-line, respectively. An image pickup apparatus according to another aspect of the present invention includes the above stereoscopic optical system comprising two optical systems arranged in parallel, and an image sensor configured to image optical images formed by the two optical systems.

Further features of the present invention will become apparent from the following description of exemplary embodiments with reference to the attached drawings.

DESCRIPTION OF THE EMBODIMENTS

Referring now to the accompanying drawings, a description will be given of examples according to the present invention. Each of stereoscopic optical systems according to Examples 1 to 5 includes two optical systems arranged in parallel with a single image sensor (image pickup element) in order to acquire a stereoscopic image by imaging. The stereoscopic optical system according to each example is used for an image pickup apparatus such as a digital camera, a video camera, a broadcasting camera, a surveillance camera, and a film-based camera.

Figure 1:
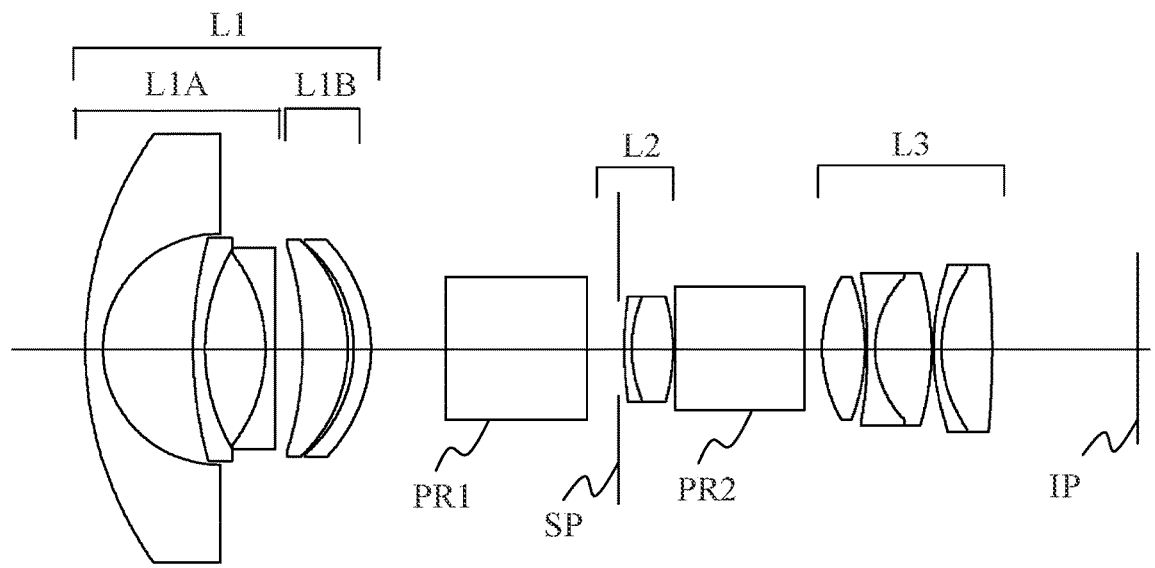
FIG. 1 is a vertical sectional view of a stereoscopic optical system according to Example 1.
Figure 2:
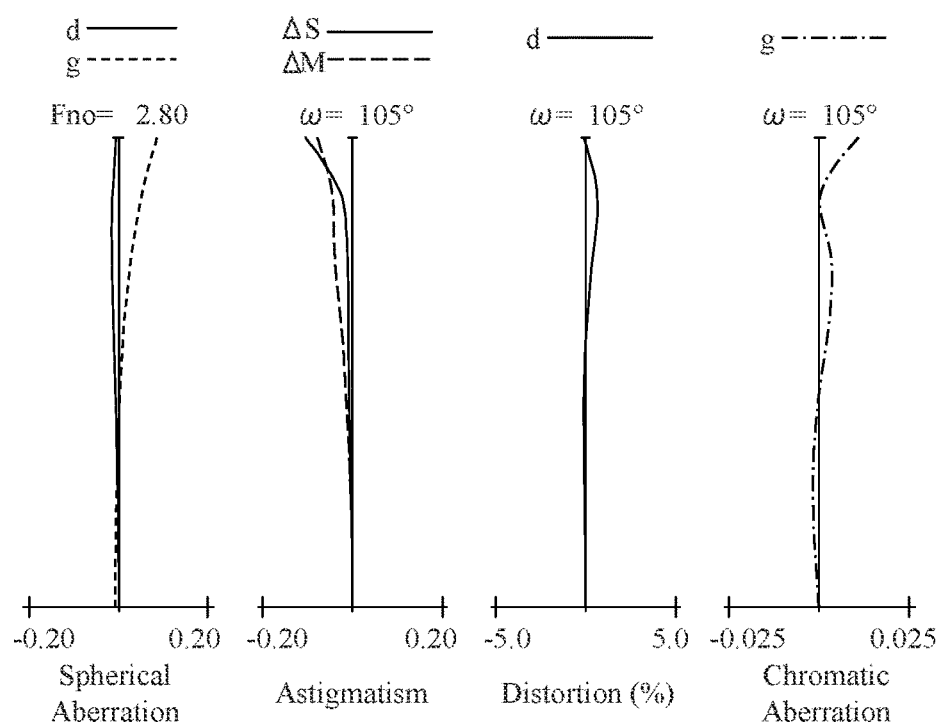
FIG. 2 is an aberration diagram of the stereoscopic optical system according to Example 1.
Figure 3:
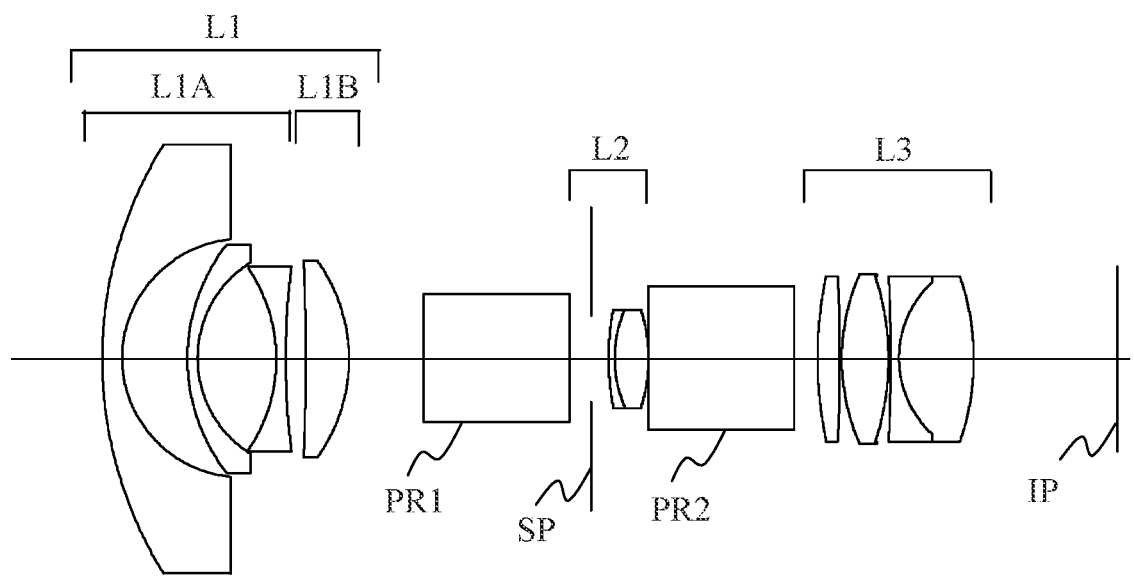
FIG. 3 is a vertical sectional view of a stereoscopic optical system according to Example 2.
Figure 4:
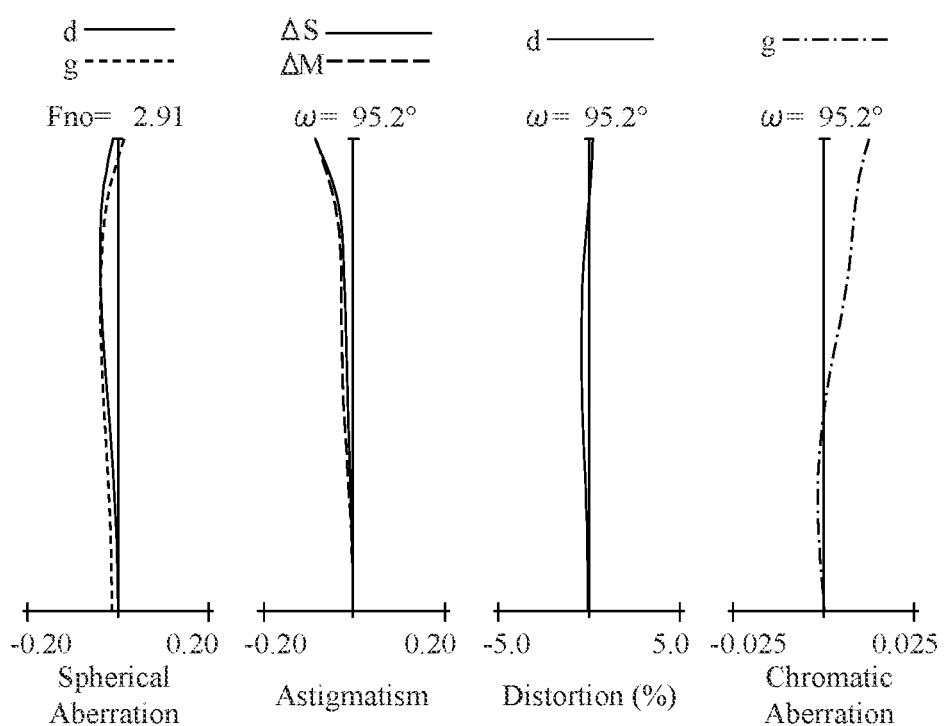
FIG. 4 is an aberration diagram of the stereoscopic optical system according to Example 2.
Figure 5:
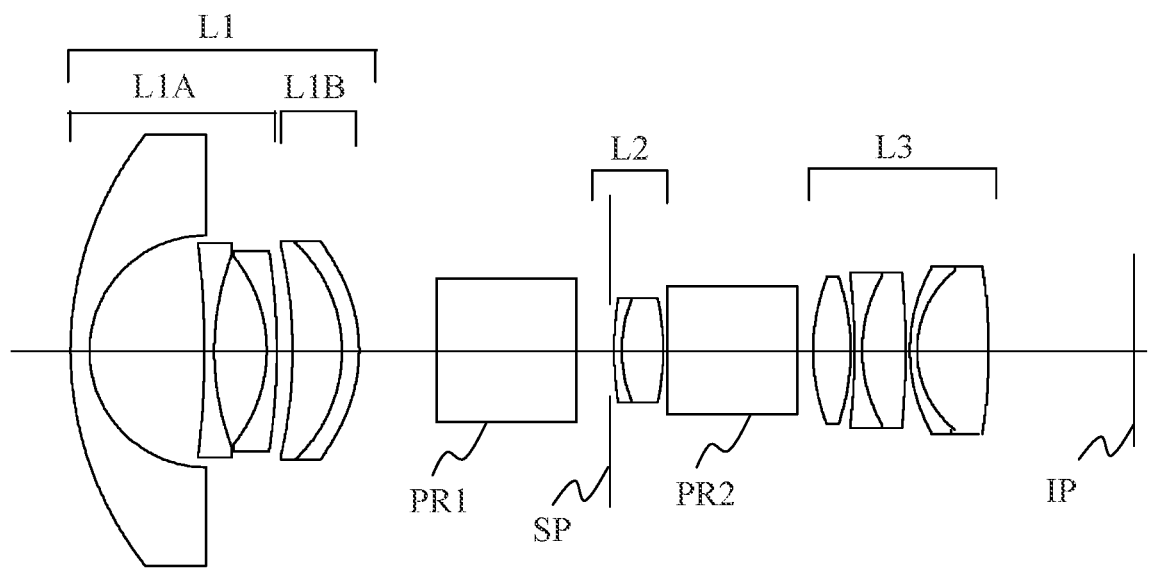
FIG. 5 is a vertical sectional view of a stereoscopic optical system according to Example 3.
Figure 6:
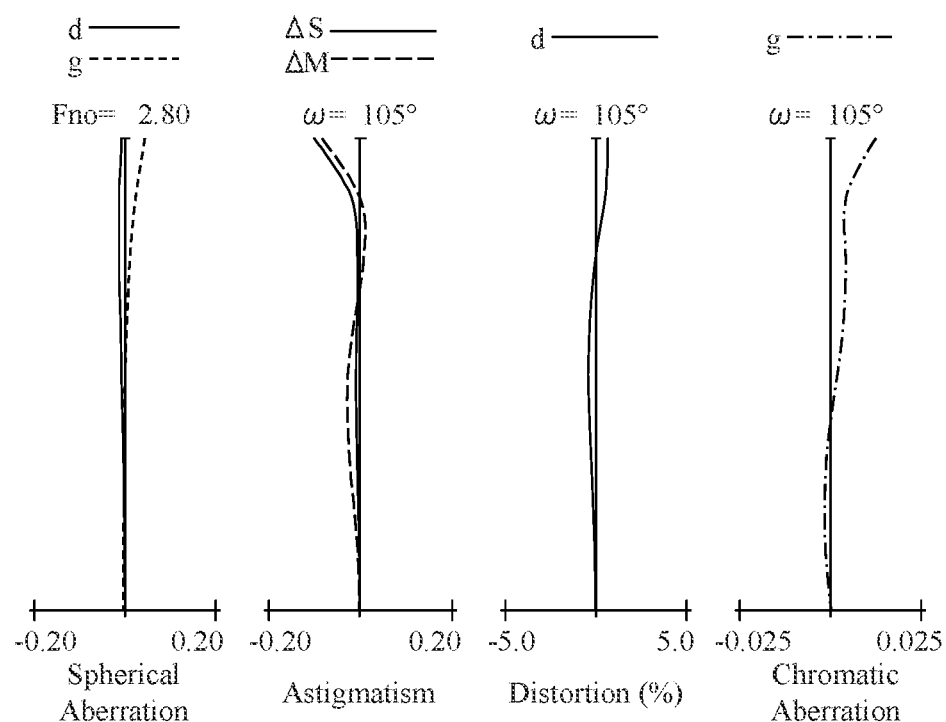
FIG. 6 is an aberration diagram of the stereoscopic optical system according to Example 3.
Figure 7:
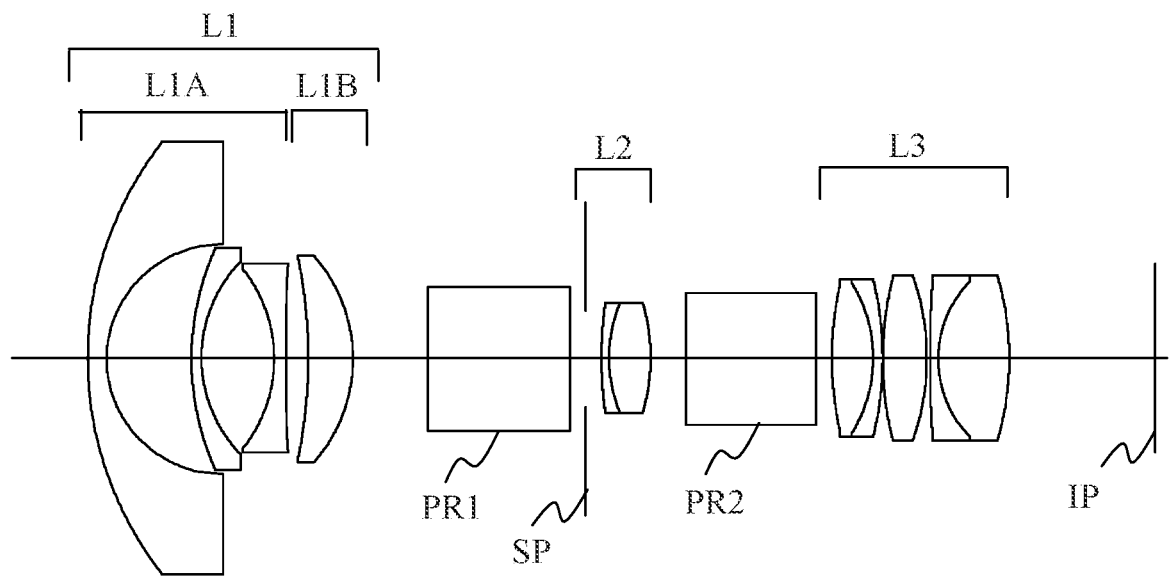
FIG. 7 is a vertical sectional view of a stereoscopic optical system according to Example 4.
Figure 8:
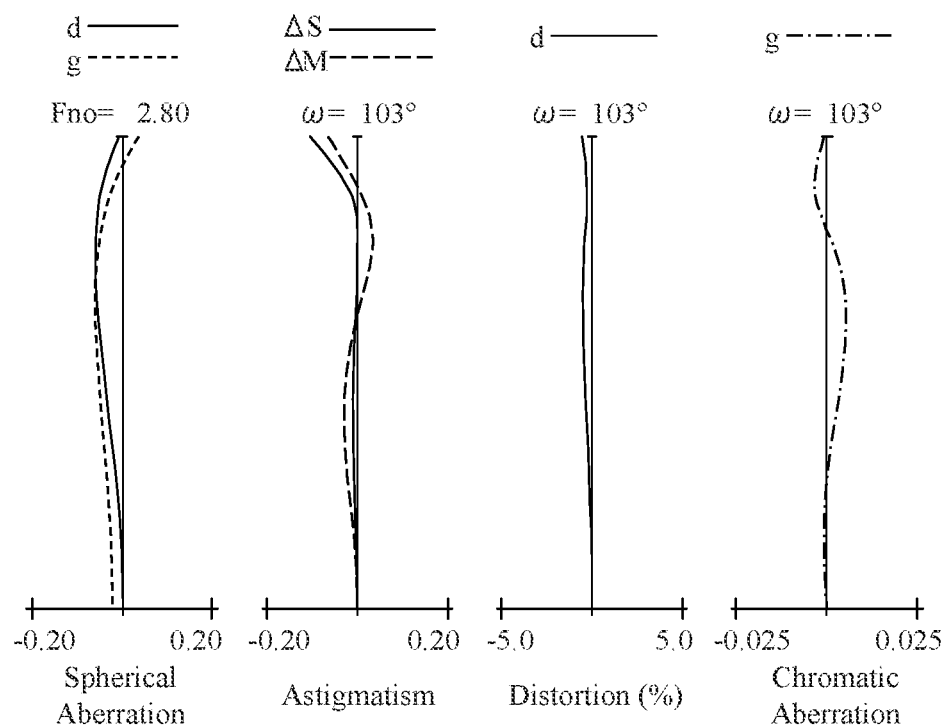
FIG. 8 is an aberration diagram of the stereoscopic optical system according to Example 4.
Figure 9:
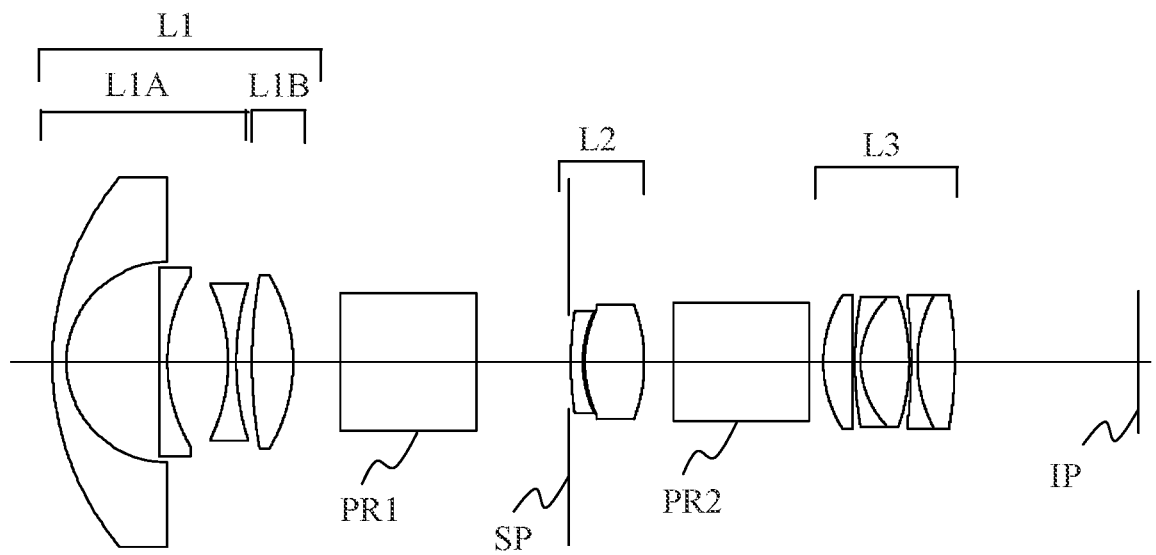
FIG. 9 is a vertical sectional view of a stereoscopic optical system according to Example 5.
Figure 10:
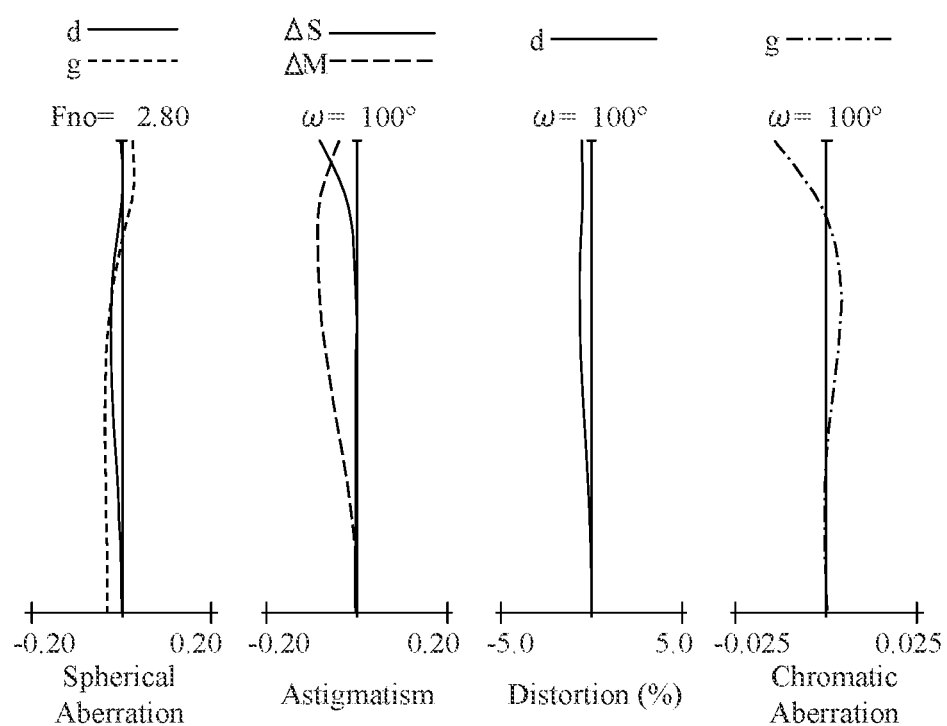
FIG. 10 is an aberration diagram of the stereoscopic optical system according to Example 5.
Figure 11:
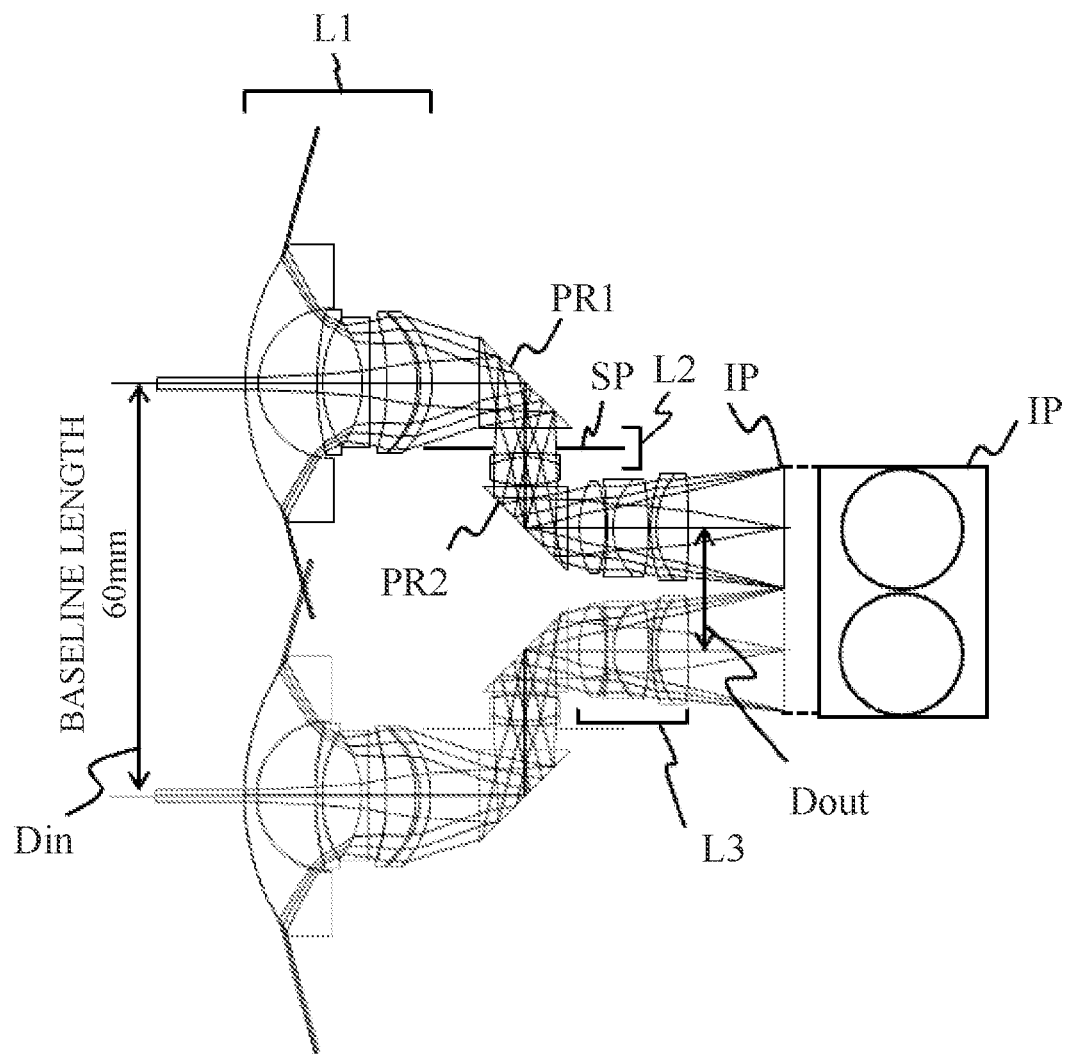
FIG. 11 is a horizontal sectional view of the stereoscopic optical system according to Example 1.

FIGS. 1, 3, 5, 7, and 9 illustrate vertical sections of the stereoscopic optical systems according to Examples (numerical examples) 1, 2, 3, 4, and 5, respectively. FIG. 11 illustrates a horizontal section of the stereoscopic optical system according to Example 1.

In each figure, a left side is an object side (front side) and a right side is an image side (rear side). L1 (i=1, 2, 3) denotes the order of lens units counted from the object side to the image side. SP denotes a diaphragm (aperture stop). IP denotes an image plane. Disposed on the image plane IP is an imaging plane of a solid-state image sensor (photoelectric conversion element) such as a CCD sensor and a CMOS sensor, and a film plane of a film-based camera. Although not illustrated, an optical block such as an optical filter, a face plate, a low-pass filter, and an infrared cut filter can be disposed on the object side of the image plane IP.

As illustrated in FIG. 11, the stereoscopic optical system includes two optical systems arranged in parallel in the horizontal direction. In Example 1, a baseline length that is a distance (Din) between surface apexes of the lens surface closest to the object in the two optical systems, in other words, a distance between the optical axes of the first lens units L1 in the two optical systems (a distance between the optical axes of the front units) is set to 60 mm. The baseline length may be about 60 to 65 mm, which corresponds to the human eye width.

Each optical system includes two reflective elements PR1 and PR2 each having a reflective surface, and as illustrated in FIG. 11, a light ray is reflected twice by the reflective surfaces to bend the optical path. FIGS. 1, 3, 5, 7, and 9 illustrate an enlarged optical path. Each example uses prisms for the first and second reflective elements PR1 and PR2, but may use mirrors. FIG. 11 also illustrates the image sensor (IP) viewed from the front side at the right part. The image circles of the two optical systems are formed within a single image sensor, and the two optical images formed by the two optical systems are imaged by the image sensor. The two optical images formed by the two optical systems may be imaged by different image sensors.

FIGS. 2, 4, 6, 8, and 10 illustrate various aberrations (such as the spherical aberration, the astigmatism, the distortion, and the chromatic aberration) in the in-focus state at infinity of the optical systems of the numerical examples 1, 2, 3, 4, and 5, respectively. In the spherical aberration diagram, Fno denotes an F-number, a solid line denotes the spherical aberration for the d-line (wavelength 587.6 nm), and a broken line denotes the spherical aberration for the g-line (wavelength 435.8 nm). In the astigmatism diagram, a solid line ΔS denotes a sagittal image plane, and a broken line ΔM denotes a meridional image plane. The distortion diagram is illustrated for the d-line. The chromatic aberration diagram illustrates the lateral chromatic aberration for the g-line, ω is the half angle of view (°).

Numerical example 1 is an example in which an image sensor has a short side length of 24 mm and a long side length of 36 mm. Since the baseline length of 60 mm is longer than the long side length of 36 mm of the image sensor, two reflective elements PR1 and PR2 are provided to each optical system so that both optical systems become closer to each other at part close to the image sensor. Thereby, the image circles of both optical systems are housed within the single image sensor.

It is necessary to house the image circle of one optical system within a range of 18 mm, which is half of the long side length of the image sensor. In numerical example 1, the image circle diameter of each optical system is set to 17.5 mm, and a distance of 1 mm is set between the image circles of the two optical systems. A distance (Lout) between the surface apexes of the lens surface closest to the image plane of the two optical systems, in other words, a distance between the optical axes of the third lens units L3 (the rear units) in the two optical systems becomes 18.5 mm. An on-axis distance between the two reflective elements (reflective surfaces) in the optical systems becomes 20.75 mm. The image circle of each optical system is formed so as to be inscribed in the short side of the image sensor.

The optical system according to each example employs a conformal projection method. The conformal projection method is defined as y=fω, where y is a half image height, ω is a half angle of view, and f is a focal length. In numerical example 1, since the image circle diameter is 17.5 mm, the half image height y=8.75 mm, the focal length f=4.78 mm, and the half angle of view ω=104.88°.

Numerical example 2 is also an example in which an image sensor has a baseline length of 60 mm, a short side length of 24 mm, and a long side length of 36 mm. The image circle diameter of each optical system is set to 17.1 mm, and a distance between the image circles of the two optical systems is set to 1.4 mm. A surface apex distance (Dout) of the lens surfaces closest to the image plane of the two optical systems becomes 18.5 mm. The image circle of each optical system is separated from the short side of the image sensor by 0.2 mm so that the image circle does not come off from the image sensor even if the position of the optical axis shifts due to a manufacturing error. In numerical example 2, a half image height y is 8.55 mm, a focal length f is 5.13 mm, and a half angle of view ω is 95.49°.

The baseline length, the sire of the image sensor, and the diameter and interval of the image circle in numerical example 3 are the same as those in numerical example 1. A focal length f is 4.74 mm, and a half angle of view ω is 105.75°.

Numerical example 4 is an example in which an image sensor has a baseline length (Din) of 65 mm, a short side length of 24 mm, and a long side length of 36 mm. A surface apex distance (Dout) of the lenses closest to the image plane of the two optical systems is set to 7.8.5 mm, and an on-axis distance between the two reflective elements of each optical system is set to 23.25 mm. In this numerical example, an image circle diameter is 17.5 mm, a half image height y is 8.75 mm, a focal length f is 4.89 mm, and a half angle of view w is 102.44'.

Numerical example 5 is an example in which an image sensor has a baseline length (Din) of 60.5 mm, a short side length of 15 mm, and a long side length of 22.5 mm. An image circle diameter of each optical system is set to 10.5 mm, and a distance between the image circles of the two optical systems is set to 1 mm. A surface apex spacing (Dout) of the lenses closest to the image plane of the two optical systems is 11.5 mm. An image circle of each optical system is separated from the short side of the image sensor by 0.25 mm. In this numerical example, a half image height y is 5.25 mm, a focal length f is 3.02 mm, and a half angle of view w is 99.67°.

The optical system according to each example adopts the conformal projection method, but may use various projection methods such as the equisolid angle projection method and the stereographic projection method.

A description will now be given of the specific configuration of the optical system according to each example. The optical system according to each example includes, in order from the object side to the image side, a first lens unit (front unit) L1 having a negative refractive power, a first reflective element PR1, an intermediate unit that includes a second lens unit L2 that includes a diaphragm SP and has a positive refractive power, and a second reflective element PR2, and a third lens unit (rear unit) L3 having a positive refractive power. The retrofocus type refractive power arrangement in which the front unit having the negative refractive power and the rear unit having the positive refractive power arranged via the diaphragm SP can make wholly small the optical system with a wide angle of view.

In each example, each of the second lens unit L2 and the third lens unit L3 has a positive refractive power, but at least one of them may have a positive refractive power.

In each example, the second lens unit L2 is disposed between the first and second reflective elements PR1 and PR2 in the intermediate unit, but the incident surfaces and exit surfaces of the first reflective element PR1 and the second reflective element PR2 may be formed as refractive surfaces instead of the second lens unit L2.

In the optical system according to each example, the diaphragm SP is disposed between the two reflective elements PR1 and PR2. As illustrated in FIG. 11, in order to form the image circles of the two optical systems within the single image sensor, it is necessary to make the lenses of the two optical systems after the second reflective element PR2 close to each other. That is, due to bending of the optical path by the first and second reflective elements PR1 and PR2, the distance between the optical axes of the third lens units L3 (the rear units) of the two optical systems needs to be smaller than the distance between the optical axes of the first lens units L1 (the front units).

If the diaphragm SP is closer to the object than the first reflective element PR1, a diameter of a lens closest to the image plane increases and may interfere with the lens closest to the image plane of the other optical system. On the other hand, if the diaphragm SP is disposed on the image side of the second reflective element PR2, a diameter of a lens closest to the object increases, may cause the optical system to be heavier or may interfere with the lens closest to the object of the other optical system.

If two reflective elements are included in each optical system as in the optical system according to each example, the overall optical length becomes long. The first lens unit L1 and the third lens unit L3 are located at positions away from the diaphragm SP, respectively. If the angle of view is simply increased in this configuration, the diameters of the lenses closest to the object and the image plane, whose effective diameters are determined by the off-axis light rays, increase, causing interference between the lenses and an increase in weight.

In order to suppress the increase in effective diameter of the lens closest to the object as the angle of view is increased, the refractive power of the first lens unit L1 may be increased. Since the distance between the first lens unit L1 and the diaphragm SP is long, when the refractive power of the first lens unit L1 is increased, the on-axis light ray is significantly diverged in the first lens unit L1, and as a result, the diaphragm SP becomes larger. In addition, the first reflective element PR1 becomes larger and the weight increases. This tendency becomes more remarkable as the diameter of the optical system is increased. Accordingly, in order to suppress an increase in effective diameter of the lens closest to the object and an increase in diaphragm diameter, it is necessary to properly set the refractive power arrangement of the lenses included in the first lens unit L1.

In the optical system according to each example, the first lens unit L includes, from the object side to the image side, a 1A lens unit (first subunit) L1A and a 1B lens unit (second subunit) L1B. The 1A lens unit L1A has a negative refractive power as a whole, and includes one or more lenses from a negative lens closest to the object to a negative lens on the object side of a positive lens on the image side of the negative lens closest to the object in the first lens unit L1. That is, the 1A lens unit L1A includes one or more negative lenses disposed on the object side of the positive lens closest to the object among one or more positive lenses included in the first lens unit L1. The 1B lens unit L1B has a positive refractive power as a whole, and includes at least one lens after the above positive lens.

The optical system according to each example satisfies the following inequality (conditional expression) (1).

$$0.20 \leq f1A/f1 \leq 0.42 \quad (1)$$

where f1A is a focal length of the 1A lens unit L1A, and f1 is a focal length of the first lens unit L1.

The inequality (1) defines a condition to reconcile a reduced diameter of the lens closest to the object and the miniaturization of the intermediate unit including the first reflective element PR1, the second lens unit, and the second reflective element PR2. In each example, the first lens unit L1 includes the 1A lens unit L1A having a strong negative refractive power and the 1B lens unit L1B having a strong positive refractive power so that the first lens unit L1 as a whole has a weak negative refractive power. The 1A lens unit L1A having the strong negative refractive power reduces the diameter of the lens closest to the object, and the 1B lens unit L1B having the strong positive refractive power reduces the divergence of the on-axis light ray passing through the first lens unit L1, thereby making small the intermediate unit.

If f1A/f1 is lower than the lower limit in the inequality (1), the refractive power of the 1A lens unit L1A becomes too large, the intermediate unit may become large, or the off-axis aberration such as the curvature of field and the distortion may increase. If f1A/f1 is higher than the upper limit in the inequality (1), the refractive power of the 1A lens unit L1A becomes too small, and the diameter of the lens closest to the object may become large.

The numerical range of the inequality (1) may be set as follows:

$$0.22 \leq f1A/f1 \leq 0.40 \quad (1a)$$

The numerical range of the inequality (1) may be set as follows:

$$0.23 \leq f1A/f1 \leq 0.35 \quad (1b)$$

In the optical system according to each example, the second lens unit L2 having a positive refractive power is disposed between the first and second reflective elements (reflective surfaces), and the off-axis light ray that has passed through the diaphragm SP is converged on the optical axis. This configuration can suppress an increase in effective diameter of the third lens unit L3. However, the second lens unit L2 is disposed near the diaphragm SP, and has a large influence on the on-axis aberration such as the spherical aberration and the coma. In order to reconcile the high performance of the optical system and the small diameter of the third lens unit L3, it is necessary to properly set the refractive powers of the second lens unit L2 and the third lens unit L3.

Accordingly, the optical system according to each example satisfies the following inequality (2):

$$0.61 \leq |f3/f2| \leq 0.90 \quad (2)$$

where f2 is a focal length of the second lens unit L2 for the d-line, and f3 is a focal length of the third lens unit L3 for the d-line.

The inequality (2) defines a condition relating to the optical performance of the optical system and the miniaturization of the third lens unit L3. If |f3/f2| is lower than the lower limit in the inequality (2), the refractive power of the second lens unit L2 becomes too small, the convergence of the off-axis light ray deteriorates, and the third lens unit L3 becomes large and may interfere with the other lens. If |f3/f2| is higher than the upper limit in the inequality (2), the refractive power of the second lens unit L2 becomes too large, the on-axis aberration such as the spherical aberration and the coma increases, and the optical performance deteriorates.

The numerical range of the inequality (2) may be set as follows:

$$0.63 \leq |f3/f2| \leq 0.88 \quad (2a)$$

The numerical range of the inequality (2) may be set as follows:

$$0.64 \leq |f3/f2| \leq 0.85 \quad (2b)$$

The above configuration and the above inequality can provide a wider angle of view and a larger diameter in a small stereoscopic optical system that horizontally arranges two optical systems to form each image circle within the single image sensor.

The following inequality may be satisfied:

$$-1.95 \leq f1B/f1 \leq -1.10 \quad (3)$$

where f1B is a focal length of the 1B lens unit L1B for the d-line.

The inequality (3) defines a condition relating to the miniaturization and the optical performance of the first reflective element PR1 and the diaphragm SP. If f1B/f1 is lower than the lower limit in the inequality (3), the refractive power of the 1B lens unit L1B becomes too small, and the on-axis light beam diverged from the 1A lens unit L1A cannot be converged, causing the first reflective element PR1 and the diaphragm SP to become large. If f1B/f1 is higher than the upper limit in the inequality (3), the off-axis aberration such as the curvature of field and the distortion generated in the 1B lens unit L1B becomes significant and deteriorates the optical performance.

The numerical range of the inequality (3) may be set as follows:

$$-1.80 \leq f1B/f1 \leq -1.15 \quad (3a)$$

The numerical range of the inequality (3) may be set as follows:

$$-1.66 \leq f1B/f1 \leq -1.20 \quad (3b)$$

The following inequality (4) may be satisfied:

$$6.10 \leq f2/f \leq 10.90 \quad (4)$$

where f is a focal length of the optical system for the d-line, and f2 is a focal length of the second lens unit L2 for the d-line.

The inequality (4) defines a conditions relating to the optical performance of the optical system and the reduced diameter of the third lens unit L3. If f2/f is lower than the lower limit in the inequality (4), the refractive power of the second lens unit L2 becomes too large, and the on-axis aberration such as the spherical aberration and the coma increases. If f2/f is higher than the upper limit in the inequality (4), the refractive power of the second lens unit L2 becomes too weak, and the convergence of the off-axis light ray that has passed through the diaphragm SP on the optical axis deteriorates. As a result, the effective diameter of the third lens unit L3 increases and may interfere with the third lens unit L3 of the other optical system.

The numerical range of the inequality (4) may be set as follows:

$$6.60 \leq f2/f \leq 10.40 \quad (4a)$$

The numerical range of the inequality (4) may be set as follows:

$$7.10 \leq f2/f \leq 9.90 \quad (4b)$$

The following inequality (5) may be satisfied:

$$4.40 \leq f3/f \leq 9.60 \quad (5)$$

where f3 is a focal length of the third lens unit for the d-line.

The inequality (5) defines a condition relating to the optical performance of the optical system and the reduced diameter of the third lens unit L3. If f3/f is lower than the lower limit in the inequality (5), the refractive power of the third lens unit L3 becomes too large, and the off-axis aberration such as the curvature of field and the distortion increases. If f3/f is higher than the upper limit in the inequality (5), the refractive power of the third lens unit L3 becomes too weak, and the convergence of the off-axis light ray that has passed through the diaphragm SP on the optical axis deteriorates. As a result, the effective diameter of the third lens unit L3 increases, and may interfere with the third lens unit L3 of the other optical system.

The numerical range of the inequality (5) may be set as follows:

$$4.70 \leq f3/f \leq 9.20 \quad (5a)$$

The numerical range of the inequality (5) may be set as follows:

$$5.00 \leq f3/f \leq 8.80 \quad (5b)$$

The following inequality (6) may be satisfied:

$$0.05 \leq Dout/Din \leq 0.50 \quad (6)$$

where Din is a distance (baseline length) between surface apexes of the lenses closest to the object of the two optical systems, and Dout is a distance between surface apexes of the lenses closest to the image plane.

The inequality (6) is a conditional expression relating to a stereoscopic effect and discomfort when the viewer views a stereoscopic image. If Dout/Din is lower than the lower limit in the inequality (6), the baseline length becomes much wider than the human eye width, so that the parallax between the images obtained through the two optical systems becomes too large, and the viewer may feel discomfortable or tired. If Dout/Din is higher than the upper limit in the inequality (6), the parallax becomes too small to obtain a stereoscopic effect.

The numerical range of the inequality (6) may be set as follows:

$$0.10 \leq Dout/Din \leq 0.45 \quad (6a)$$

The numerical range of the inequality (6) may be set as follows:

$$0.15 \leq Dout/Din \leq 0.40 \quad (6b)$$

The following inequality (7) may be satisfied:

$$1.80 \leq N1Ave \leq 2.20 \quad (7)$$

where N1Aave is an average of the refractive indexes among the plurality of negative lenses included in the 1A lens unit L1A for the d-line.

The inequality (7) defines a condition relating to the optical performance of the optical system. As described above, the first lens unit L1A has a strong negative refractive power in order to reduce the diameter of the first lens unit L1. Therefore, the off-axis aberration such as the curvature of field and the distortion is likely to occur, and a glass material having a high refractive index may be used for the high image quality. If N1Aave is lower than the lower limit in the inequality (7), the refractive index of the negative lens in the 1A lens unit L1A is too low and the off-axis aberration increases. If N1Aave is higher than the upper limit in the inequality (7), the workability of the lens is lowered.

The numerical range of the inequality (7) may be set as follows:

$$1.85 \leq N1Ave \leq 2.10 \tag{7a}$$

The numerical range of the inequality (7) may be set as follows:

$$1.88 \leq N1Ave \leq 2.05 \tag{7b}$$

The following inequality (8) may be satisfied:

$$1.78 \leq N1Bp \leq 2.20 \tag{8}$$

where N1Bp is a refractive index of the positive lens having the strongest refractive power among at least one positive lens included in the 1B lens unit L1B for the d-line.

The inequality (8) defines a condition relating to the optical performance of the optical system and the miniaturization of the first reflective element PR1 and the diaphragm SP. As described above, the 1B lens unit L1B converges the on-axis light beam strongly diverged by the 1A lens unit L1A, and miniaturizes the subsequent first reflective element PR1 and aperture SP. If N1Bp is lower than the lower limit in the inequality (8), the refractive power of the 1B lens unit becomes too strong, the aberration generated in the 1B lens unit becomes significant, and the optical performance deteriorates. If N1Bp is higher than the upper limit in the inequality (8), the workability of the lens is deteriorated.

The numerical range of the inequality (8) may be set as follows:

$$1.80 \leq N1Bp \leq 2.10 \tag{8a}$$

The numerical range of the inequality (8) may be set as follows:

$$1.83 \leq N1Bp = 2.05 \tag{8b}$$

The following inequality (9) may be satisfied:

$$85,0° \leq \omega \leq 120.0° \tag{9}$$

where ω is a half angle of view by ray tracing of the optical system.

If ω is lower than the lower limit in the inequality (9), the angle of view is insufficient when the viewer views the stereoscopic image, and sufficient reality cannot be gained. If ω is higher than the upper limit in the inequality (9), the number of pixels per incident angle on the image sensor decreases, and the resolution of the stereoscopic image becomes insufficient.

The numerical range of the inequality (9) may be set as follows:

$$87.5' \leq \omega \leq 115.0° \tag{9a}$$

The numerical range of the inequality (9) may be set as follows:

$$90.0° \leq \omega \leq 110.0° \tag{9b}$$

The following inequality (10) may be satisfied:

$$2.00 \leq Fno \leq 4.50 \tag{10}$$

where Fno is an F-number of the optical system.

If Fno is lower than the lower limit in the inequality (10), the first and second reflective elements PR1 and PR2 and the diaphragm SP become large. If Fno is higher than the upper limit in the inequality (10), the image quality deteriorates due to increased noises during imaging.

The numerical range of the inequality (10) may be set as follows:

$$2.20 \leq Fno \leq 4.10 \tag{10a}$$

The numerical range of the inequality (be set as follows:

$$2.40 \leq Fno \leq 3.60 \tag{10b}$$

Next follows a description of a configuration of each lens unit according to each example. In Examples 1, 2, 4, and 5, the 1A lens unit L1A includes, in order from the object side to the image side, a negative meniscus lens with a convex surface facing the object side, a negative meniscus lens with a convex surface facing the object side, and a biconcave lens. In Example 4, an aspherical surface on the image side of the biconcave lens corrects the off-axis aberration such as the curvature of field and the distortion. In Example 3, the 1A lens unit L1A includes, in order from the object side to the image side, a negative meniscus lens with a convex surface facing the object side, a biconcave lens, and a negative meniscus lens with a convex surface facing the image side.

In Example 1, the 1B lens unit L1B includes, in order from the object side to the image side, a positive meniscus lens with a convex surface facing the image side, and a negative meniscus lens with a convex surface facing the image side. An aspherical surface on the image side of the negative meniscus lens corrects the off-axis aberration such as the curvature of field and the distortion. In Examples 2 and 4, the 1B lens unit L1B includes a positive meniscus lens with a convex surface facing the image side. In Example 3, the 1B lens unit L1B includes, in order from the object side to the image side, a cemented lens of a positive meniscus lens with a convex surface facing the image side and a negative meniscus lens with a convex surface facing the image side. An aspherical surface on the image side of the negative meniscus lens corrects the off-axis aberration such as the curvature of field and the distortion. In Example 5, the 1B lens unit L1B includes a biconvex lens.

Examples 1 to 5 use prisms for the first and second reflective elements PR1 and PR2.

In Examples 1 to 4, the second lens unit L2 includes, in order from the object side to the image side, the diaphragm SP and a cemented lens of a negative meniscus lens with a convex surface facing the object side and a biconvex lens. In Example 5, the second lens unit L2 includes, in order from the object side to the image side, the diaphragm SP, a negative meniscus lens with a convex surface facing the object side, and a biconvex lens.

In Examples 1 and 3, the third lens unit L3 includes, in order from the object side to the image side, a biconvex lens, a cemented lens of a biconcave lens and a biconvex lens, and a cemented lens of a negative meniscus lens with a convex surface facing the object side and a biconvex lens, in Example 2, the third lens unit L3 includes, in order from the object side to the image side, a biconvex lens, a biconvex lens, and a cemented lens of a biconvex lens and a biconvex lens. In Example 4, the third lens unit L3 includes, in order from the object side to the image side, a cemented lens of a biconvex lens and a negative meniscus lens with a convex surface facing the image side, a biconvex lens, and a cemented lens of a negative meniscus lens with a convex surface facing the object side and a biconvex lens. In Example 5, the third lens unit L3 includes, in order from the object side to the image side, a biconvex lens, a cemented lens of a negative meniscus lens with a convex surface facing the object side and a biconvex lens, and a cemented lens of a biconcave lens and a biconvex lens.

NM Specific numerical data of numerical examples 1 to 5 will be shown below. In each numerical example, i denotes the order of a surface or an optical element counted from the object side, r denotes a radius of curvature of an i-th optical surface (i-th surface), and d denotes an on-axis distance between an i-th surface and an (i+1)-th surface. nd denotes a refractive index of an optical material between an i-th surface and an (i+1)-th surface for the d-line, and vdi denotes an Abbe number based on the d-line of an optical material between an i-th surface and an (i+1)-th surface.

The Abbe number vd is expressed as follows:

$$vd = (Nd-1)/(NF-NC)$$

where Nd, NF, and NC are refractive indexes for the d-line (587.6 nm), the F-line (486.1 nm), and the C-line (656.3 nm) in the Fraunhofer lines.

Numerical data also shows an effective diameter (mm) of an i-th surface. BF denotes a backfocus (mm). The backfocus is described by converting an on-axis distance from the final surface (lens surface closest to the image plane) of the optical system to the paraxial image plane to an air equivalent length. The overall lens length is a length obtained by adding the backfocus to an on-axis distance from the frontmost surface (lens surface closest to the object) to the final surface of the optical system.

The first and second reflective elements in each numerical example are described as one block material. In reality, each reflective element is disposed so as to bend a light ray by 45° with respect to the center of the block material.

Each numerical example adopts a method in which the entire optical system is drawn in the optical axis direction during focusing from an infinity object to a short-distance object. For the weight reduction of the driving unit that drives the optical system, the optical system may be partially driven during focusing.

An asterisk "*" attached to a surface number means that the surface is aspherical surface. The aspheric shape is expressed as follows:

$$X = \frac{H^2/R}{1 + \sqrt{1 - (1+K)(H/R)^2}} + A4H^4 + A6H^6 + A8H^8 + A10H^{10} (+A12H^{12})$$

where X-axis is set to the optical axis direction, H-axis is set to a direction orthogonal to the optical axis, a light traveling direction is set positive, R is a paraxial radius of curvature, K is a conical constant, A4, A6, A8, A10 and (A12) are aspherical coefficients, and "e-x" of the conical constant and the aspherical coefficient means $\times 10^{-x}$.

Table 1 summarizes values of the inequalities (1) to (10) in Examples (numerical examples) 1 to 5.

NUMERICAL EXAMPLE 1

UNIT: mm
Surface Data

| Surface No: | r | d | nd | vd | Effective Diameter |
|---|---|---|---|---|---|
| 1 | 34.245 | 1.75 | 2.00100 | 29.1 | 38.55 |
| 2 | 10.727 | 8.36 | | | 21.09 |
| 3 | 40.942 | 0.95 | 1.95375 | 32.3 | 19.57 |
| 4 | 17.998 | 5.62 | | | 17.39 |
| 5 | −14.473 | 0.95 | 1.88300 | 40.8 | 16.55 |
| 6 | 485.400 | 2.55 | | | 17.39 |
| 7 | −30.711 | 4.23 | 2.00069 | 25.5 | 17.94 |
| 8 | −13.665 | 0.59 | | | 18.90 |
| 9 | −12.726 | 1.55 | 1.58313 | 59.4 | 18.41 |
| 10* | −13.253 | 6.90 | | | 18.95 |
| 11 | ∞ | 13.00 | 1.51633 | 64.1 | 12.30 |
| 12 | ∞ | 3.00 | | | 8.43 |
| 13 (diaphragm) | ∞ | 0.50 | | | 8.81 |
| 14 | 34.485 | 0.70 | 1.90043 | 37.4 | 8.91 |
| 15 | 12.617 | 3.80 | 1.54072 | 47.2 | 8.84 |
| 16 | −19.342 | 0.25 | | | 9.09 |
| 17 | ∞ | 12.00 | 1.51633 | 64.1 | 9.01 |
| 18 | ∞ | 1.63 | | | 10.41 |
| 19 | 13.588 | 3.89 | 1.43875 | 94.7 | 12.17 |
| 20 | −19.839 | 0.20 | | | 12.25 |
| 21 | −41.411 | 0.85 | 1.83481 | 42.7 | 12.09 |
| 22 | 9.542 | 5.12 | 1.49700 | 81.5 | 12.15 |
| 23 | −25.605 | 0.30 | | | 13.08 |
| 24 | 23.211 | 0.75 | 1.90043 | 37.4 | 13.98 |
| 25 | 13.141 | 4.61 | 1.49700 | 81.5 | 13.83 |
| 26 | −73.713 | 13.51 | | | 14.32 |
| Image plane | ∞ | | | | |

ASPHERIC DATA

10th Surface
K = 0.00000e+000 A 4 = 3.30939e−005 A 6 = −1.46934e−008
A 8 = 8.65575e−010 A 10 = −1.57365e−012

VARIOUS DATA

| | |
|---|---|
| Focal Length | 4.78 |
| Fno | 2.80 |
| Half Angle of View (°) | 104.88 |
| Image Height | 8.75 |
| Overall Lens Length | 97.55 |
| BF | 13.51 |
| Entrance pupil position | 10.45 |
| Exit pupil position | −50.46 |
| Front Principal Position | 14.87 |
| Rear Principal Position | 8.73 |

SINGLE LENS DATA

| Unit | Starting Surface | Focal Length | Structural Lens length | Front Principal Position | Rear Principal Position |
|---|---|---|---|---|---|
| L1 | 1 | −14.49 | 26.54 | −1.19 | −40.65 |
| L2 | 13 | 38.90 | 5.00 | 3.20 | −0.17 |
| L3 | 19 | 30.52 | 15.71 | 4.44 | −7.19 |

Single Lens Data

| Lens | Starting Surface | Focal Length |
|---|---|---|
| 1 | 1 | −16.21 |
| 2 | 3 | −34.37 |
| 3 | 5 | −15.90 |
| 4 | 7 | 21.89 |
| 5 | 9 | 6615.95 |
| 6 | 11 | 0.00 |
| 7 | 14 | −22.44 |
| 8 | 15 | 14.74 |
| 9 | 17 | 0.00 |
| 10 | 19 | 19.06 |
| 11 | 21 | −9.22 |
| 12 | 22 | 14.70 |
| 13 | 24 | −34.87 |
| 14 | 25 | 22.84 |

NUMERICAL EXAMPLE 2

UNIT: mm
Surface Data

| Surface No: | r | d | nd | vd | Effective Diameter |
|---|---|---|---|---|---|
| 1 | 37.835 | 1.90 | 1.85150 | 40.8 | 38.26 |
| 2 | 11.044 | 5.89 | | | 21.36 |
| 3 | 16.936 | 1.05 | 2.00100 | 29.1 | 19.71 |
| 4 | 10.396 | 7.26 | | | 16.44 |
| 5 | −14.348 | 0.85 | 1.85150 | 40.8 | 15.40 |
| 6 | 78.512 | 1.83 | | | 15.94 |
| 7 | −171.522 | 3.90 | 1.91650 | 31.6 | 16.52 |
| 8 | −16.120 | 6.99 | | | 17.01 |
| 9 | ∞ | 13.40 | 1.51633 | 64.1 | 10.84 |
| 10 | ∞ | 2.05 | | | 7.72 |
| 11 (diaphragm) | ∞ | 1.65 | | | 8.01 |
| 12 | 32.437 | 0.50 | 1.90043 | 37.4 | 8.29 |
| 13 | 11.736 | 3.00 | 1.54072 | 47.2 | 8.25 |
| 14 | −19.189 | 0.15 | | | 8.46 |
| 15 | ∞ | 13.40 | 1.51633 | 64.1 | 8.42 |
| 16 | ∞ | 2.17 | | | 12.34 |
| 17 | 40.449 | 2.00 | 1.80809 | 22.8 | 14.04 |
| 18 | −112.028 | 0.15 | | | 14.23 |
| 19 | 19.706 | 4.25 | 1.49700 | 81.6 | 14.55 |
| 20 | −26.991 | 0.32 | | | 14.29 |
| 21 | −125.299 | 0.75 | 2.00069 | 25.5 | 13.72 |
| 22 | 9.886 | 6.90 | 1.49700 | 81.6 | 13.06 |
| 23 | −22.112 | 13.21 | | | 14.22 |
| Image plane | ∞ | | | | |

VARIOUS DATA

| | |
|---|---|
| Focal Length | 5.13 |
| Fno | 2.91 |
| Half Angle of View (°) | 95.49 |
| Image Height | 8.55 |
| Overall Lens Length | 93.57 |
| BF | 13.21 |
| Entrance pupil position | 10.91 |
| Exit pupil position | −54.55 |
| Front Principal Position | 15.66 |
| Rear Principal Position | 8.08 |

SINGLE LENS DATA

| Unit | Starting Surface | Focal Length | Structural Lens length | Front Principal Position | Rear Principal Position |
|---|---|---|---|---|---|
| L1 | 1 | −12.41 | 22.68 | 1.27 | −25.53 |
| L2 | 11 | 39.29 | 5.15 | 3.80 | −0.08 |
| L3 | 17 | 27.80 | 14.37 | 1.87 | −8.65 |

Single Lens Data

| Lens | Starting Surface | Focal Length |
|---|---|---|
| 1 | 1 | −18.93 |
| 2 | 3 | −29.24 |
| 3 | 5 | −14.19 |
| 4 | 7 | 19.18 |
| 5 | 9 | 0.00 |
| 6 | 12 | −20.66 |
| 7 | 13 | 13.94 |
| 8 | 15 | 0.00 |
| 9 | 17 | 36.99 |
| 10 | 19 | 23.63 |
| 11 | 21 | −9.13 |
| 12 | 22 | 14.81 |

NUMERICAL EXAMPLE 3

UNIT: mm
Surface Data

| Surface No: | r | d | nd | vd | Effective Diameter |
|---|---|---|---|---|---|
| 1 | 32.204 | 1.75 | 2.00100 | 29.1 | 38.50 |
| 2 | 10.699 | 10.58 | | | 21.07 |
| 3 | −78.044 | 0.95 | 2.00100 | 29.1 | 18.41 |
| 4 | 24.653 | 4.81 | | | 16.60 |
| 5 | −14.061 | 0.95 | 1.91082 | 35.3 | 16.18 |
| 6 | −60.746 | 1.47 | | | 17.36 |
| 7 | −43.270 | 4.57 | 2.00069 | 25.5 | 17.96 |
| 8 | −13.755 | 1.50 | 1.58313 | 59.4 | 18.81 |
| 9* | −14.442 | 7.07 | | | 19.10 |
| 10 | ∞ | 13.00 | 1.51633 | 64.1 | 12.30 |
| 11 | ∞ | 3.00 | | | 8.29 |
| 12 (diaphragm) | ∞ | 0.50 | | | 8.64 |
| 13 | 40.250 | 0.70 | 1.87070 | 40.7 | 8.72 |
| 14 | 12.989 | 3.80 | 1.54072 | 47.2 | 8.67 |
| 15 | −20.730 | 0.25 | | | 8.94 |
| 16 | ∞ | 12.00 | 1.51633 | 64.1 | 8.88 |
| 17 | ∞ | 1.50 | | | 10.86 |
| 18 | 18.363 | 3.55 | 1.43875 | 94.7 | 12.39 |
| 19 | −20.988 | 0.20 | | | 12.62 |
| 20 | −78.396 | 0.85 | 1.83481 | 42.7 | 12.58 |
| 21 | 13.807 | 3.95 | 1.49700 | 81.5 | 12.71 |
| 22 | −74.957 | 0.30 | | | 13.35 |
| 23 | 15.313 | 0.75 | 2.00100 | 29.1 | 14.22 |
| 24 | 9.426 | 6.50 | 1.49700 | 81.5 | 13.58 |
| 25 | −65.349 | 13.51 | | | 14.31 |
| Image plane | ∞ | | | | |

ASPHERIC DATA

9th Surface
K = 0.00000e+000 A 4 = 3.82080e−005 A 6 = 1.00161e−007
A 8 = −1.70767e−010 A 10 = 4.27075e−012

VARIOUS DATA

| | |
|---|---|
| Focal Length | 4.74 |
| Fno | 2.80 |
| Half Angle of View (°) | 105.75 |
| Image Height | 8.75 |
| Overall Lens Length | 98.00 |
| BF | 13.51 |
| Entrance pupil position | 10.62 |
| Exit pupil position | −49.18 |
| Front Principal Position | 15.01 |
| Rear Principal Position | 8.77 |

SINGLE LENS DATA

| Unit | Starting Surface | Focal Length | Structural Lens length | Front Principal Position | Rear Principal Position |
|---|---|---|---|---|---|
| L1 | 1 | −15.82 | 26.58 | −2.05 | −45.04 |
| L2 | 12 | 44.37 | 5.00 | 3.39 | 0.03 |
| L3 | 18 | 28.89 | 16.09 | 3.69 | −7.86 |

Single Lens Data

| Lens | Starting Surface | Focal Length |
|---|---|---|
| 1 | 1 | −16.69 |
| 2 | 3 | −18.63 |
| 3 | 5 | −20.28 |
| 4 | 7 | 18.70 |
| 5 | 8 | −2533.25 |
| 6 | 10 | 0.00 |
| 7 | 13 | −22.29 |
| 8 | 14 | 15.38 |
| 9 | 16 | 0.00 |
| 10 | 18 | 22.95 |

-continued

| | | |
|---|---|---|
| 11 | 20 | −14.00 |
| 12 | 21 | 23.81 |
| 13 | 23 | −26.16 |
| 14 | 24 | 17.07 |

NUMERICAL EXAMPLE 4

UNIT: mm
Surface Data

| Surface No: | r | d | nd | vd | Effective Diameter |
|---|---|---|---|---|---|
| 1 | 32.204 | 1.75 | 2.00100 | 29.1 | 38.51 |
| 2 | 10.624 | 7.72 | | | 20.97 |
| 3 | 24.232 | 0.95 | 2.00100 | 29.1 | 19.34 |
| 4 | 12.748 | 6.79 | | | 16.60 |
| 5 | −12.957 | 0.95 | 1.85400 | 40.4 | 15.34 |
| 6* | 278.285 | 2.15 | | | 16.29 |
| 7 | −48.376 | 4.10 | 2.00100 | 29.1 | 17.03 |
| 8 | −14.676 | 6.90 | | | 17.92 |
| 9 | ∞ | 13.00 | 1.51633 | 64.1 | 12.30 |
| 10 | ∞ | 1.50 | | | 8.64 |
| 11 (diaphragm) | ∞ | 1.50 | | | 8.87 |
| 12 | 44.079 | 0.70 | 1.83481 | 42.7 | 9.13 |
| 13 | 13.067 | 3.80 | 1.54072 | 47.2 | 9.11 |
| 14 | −17.531 | 3.25 | | | 9.41 |
| 15 | ∞ | 12.00 | 1.51633 | 64.1 | 9.00 |
| 16 | ∞ | 1.50 | | | 11.20 |
| 17 | 33.445 | 3.77 | 1.49700 | 81.5 | 12.40 |
| 18 | −12.867 | 0.85 | 1.80400 | 46.6 | 12.76 |
| 19 | −34.227 | 0.00 | | | 13.48 |
| 20 | 27.869 | 4.13 | 1.49700 | 81.5 | 14.06 |
| 21 | −22.810 | 0.30 | | | 14.20 |
| 22 | 148.722 | 0.75 | 1.95375 | 32.3 | 13.82 |
| 23 | 10.283 | 6.47 | 1.49700 | 81.5 | 13.32 |
| 24 | −27.769 | 13.51 | | | 14.32 |
| Image plane | ∞ | | | | |

ASPHERIC DATA

6th Surface
K = 0.00000e+000 A 4 = 3.25358e−005 A 6 = 2.20598e−007
A 8 = −6.10712e−009 A 10 = 3.74834e−011 A 12 = −7.69846e−014

VARIOUS DATA

| | |
|---|---|
| Focal Length | 4.89 |
| Fno | 2.80 |
| Half Angle of View (°) | 102.44 |
| Image Height | 8.75 |
| Overall Lens Length | 98.35 |
| BF | 13.51 |
| Entrance pupil position | 10.31 |
| Exit pupil position | −85.68 |
| Front Principal Position | 14.97 |
| Rear Principal Position | 8.67 |

SINGLE LENS DATA

| Unit | Starting Surface | Focal Length | Structural Lens length | Front Principal Position | Rear Principal Position |
|---|---|---|---|---|---|
| L1 | 1 | −17.10 | 24.42 | 0.63 | −31.44 |
| L2 | 11 | 36.40 | 6.00 | 4.41 | 0.04 |
| L3 | 17 | 30.57 | 16.27 | 4.35 | −7.37 |

Single Lens Data

| Lens | Starting Surface | Focal Length |
|---|---|---|
| 1 | 1 | −16.51 |
| 2 | 3 | −28.03 |

-continued

| | | |
|---|---|---|
| 3 | 5 | −14.48 |
| 4 | 7 | 19.84 |
| 5 | 9 | 0.00 |
| 6 | 12 | −22.48 |
| 7 | 13 | 14.48 |
| 8 | 15 | 0.00 |
| 9 | 17 | 19.22 |
| 10 | 18 | −26.11 |
| 11 | 20 | 25.94 |
| 12 | 22 | −11.61 |
| 13 | 23 | 16.00 |

NUMERICAL EXAMPLE 5

UNIT: mm
Surface Data

| Surface No: | r | d | nd | vd | Effective Diameter |
|---|---|---|---|---|---|
| 1 | 21.335 | 1.10 | 2.00100 | 29.1 | 26.01 |
| 2 | 7.424 | 6.76 | | | 14.61 |
| 3 | 286.662 | 0.60 | 2.00100 | 29.1 | 13.07 |
| 4 | 12.363 | 4.48 | | | 11.49 |
| 5 | −12.962 | 0.60 | 1.88300 | 40.8 | 10.31 |
| 6 | 18.337 | 1.15 | | | 10.60 |
| 7 | 31.801 | 3.11 | 1.84666 | 23.9 | 11.39 |
| 8 | −12.417 | 3.47 | | | 11.69 |
| 9 | ∞ | 10.00 | 1.51633 | 64.1 | 9.50 |
| 10 | ∞ | 6.85 | | | 6.62 |
| 11 (diaphragm) | ∞ | 0.15 | | | 7.03 |
| 12 | 26.581 | 0.80 | 1.88300 | 40.8 | 7.10 |
| 13 | 8.264 | 0.15 | | | 7.04 |
| 14 | 8.470 | 4.38 | 1.54072 | 47.2 | 7.20 |
| 15 | −13.128 | 2.17 | | | 7.70 |
| 16 | ∞ | 10.00 | 1.51633 | 64.1 | 7.50 |
| 17 | ∞ | 1.03 | | | 8.13 |
| 18 | 9.163 | 2.19 | 1.43875 | 94.7 | 9.07 |
| 19 | −230.699 | 0.13 | | | 9.00 |
| 20 | 23.408 | 0.50 | 2.00100 | 29.1 | 8.93 |
| 21 | 6.789 | 3.52 | 1.49700 | 81.5 | 8.52 |
| 22 | −14.303 | 0.15 | | | 8.78 |
| 23 | −50.245 | 0.50 | 2.00100 | 29.1 | 8.76 |
| 24 | 11.044 | 2.70 | 1.80810 | 22.8 | 8.88 |
| 25 | −33.265 | 13.50 | | | 9.14 |
| Image plane | ∞ | | | | |

VARIOUS DATA

| | |
|---|---|
| Focal Length | 3.02 |
| Fno | 2.80 |
| Half Angle of View (°) | 99.67 |
| Image Height | 5.25 |
| Overall Lens Length | 80.00 |
| BF | 13.50 |
| Entrance pupil position | 7.33 |
| Exit pupil position | −46.97 |
| Front Principal Position | 10.19 |
| Rear Principal Position | 10.48 |

SINGLE LENS DATA

| Unit | Starting Surface | Focal Length | Structural Lens length | Front Principal Position | Rear Principal Position |
|---|---|---|---|---|---|
| L1 | 1 | −6.61 | 17.81 | 1.75 | −19.10 |
| L2 | 11 | 29.80 | 5.48 | 4.14 | 0.67 |
| L3 | 18 | 25.05 | 9.69 | 1.71 | −5.04 |

Single Lens Data

| Lens | Starting Surface | Focal Length |
|---|---|---|

-continued

| 1 | 1 | −11.85 |
| 2 | 3 | −12.92 |
| 3 | 5 | −8.52 |
| 4 | 7 | 10.90 |
| 5 | 9 | 0.00 |
| 6 | 12 | −13.86 |
| 7 | 14 | 10.25 |
| 8 | 16 | 0.00 |
| 9 | 18 | 20.14 |
| 10 | 20 | −9.70 |
| 11 | 21 | 9.81 |
| 12 | 23 | −9.01 |
| 13 | 24 | 10.55 |

TABLE 1

| | | Ex. 1 | Ex. 2 | Ex. 3 | Ex. 4 | Ex. 5 |
|---|---|---|---|---|---|---|
| Inequality 1 | f1A/f1 | 0.29 | 0.33 | 0.24 | 0.31 | 0.30 |
| Inequality 2 | f3/f2 | 0.78 | 0.71 | 0.65 | 0.84 | 0.84 |
| Inequality 3 | f1B/f1 | −1.57 | −1.55 | −1.24 | −1.64 | −1.65 |
| Inequality 4 | f2/f | 8.14 | 7.65 | 9.36 | 7.44 | 9.87 |
| Inequality 5 | f3/f | 6.38 | 5.42 | 6.09 | 6.25 | 8.30 |
| Inequality 6 | Dout/Din | 0.31 | 0.31 | 0.31 | 0.28 | 0.19 |
| Inequality 7 | N1Aave | 1.95 | 1.90 | 1.97 | 1.95 | 1.96 |
| Inequality 8 | N1Bp | 2.00 | 1.92 | 2.00 | 2.00 | 1.85 |
| Inequality 9 | ω | 104.9 | 95.4 | 105.8 | 102.4 | 99.7 |
| Inequality 10 | Fno | 2.80 | 2.91 | 2.80 | 2.80 | 2.80 |

Figure 12:
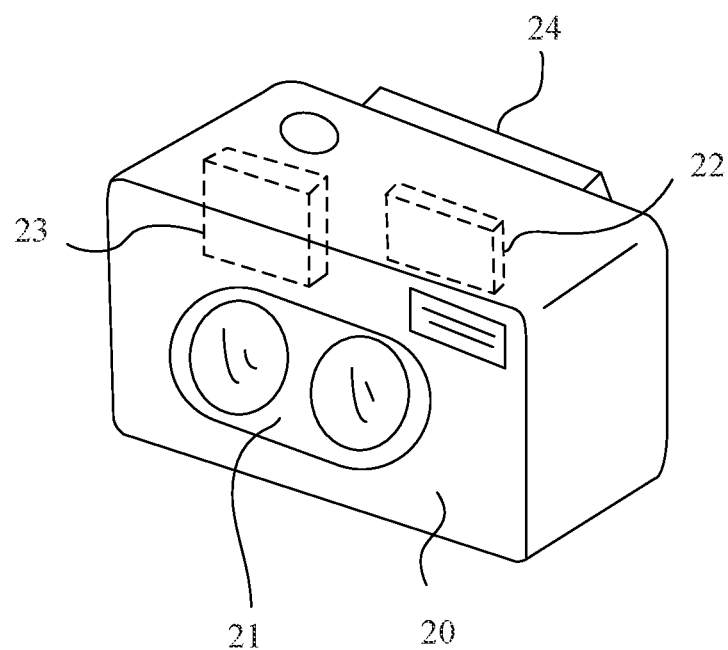
FIG. 12 is an external view of an image pickup apparatus including the stereoscopic optical system according to any one of the examples.

FIG. 12 illustrates a digital still camera as an image pickup apparatus that uses the stereoscopic optical system according to any one of the above examples for an imaging optical system. Reference numeral 20 denotes a camera body, and reference numeral 21 denotes the imaging optical system that is the stereoscopic optical system according to any one of Examples 1 to 5. Reference numeral 22 denotes a solid-state image sensor such as a CCD sensor and a CMOS sensor, which is built in the camera body 20 and configured to image an optical image formed by the imaging optical system 21. Reference numeral 23 denotes a recorder configured to record image data generated by processing an imaging signal from the image sensor 22, and reference numeral 24 denotes a rear display unit that displays the image data.

The stereoscopic optical system according to each example can provide a small stereoscopic camera having a high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-004230, filed on Jan. 14, 2021, which is hereby incorporated by reference herein in its entirety.

What is claimed is:

1. A stereoscopic optical system comprising two optical systems arranged in parallel,
wherein each of the two optical systems includes, in order from an object side to an image side, a front unit having a negative refractive power, an intermediate unit having two reflective surfaces, and a rear unit,
wherein a distance between optical axes of rear units is smaller than a distance between optical axes of front units in the two optical systems due to bending of an optical path by the two reflective surfaces,
wherein at least one of the intermediate unit and the rear unit has a positive refractive power,
wherein the front unit includes, in order from the object side to the image side, a first subunit consisting of one or more negative lenses disposed on the object side of a positive lens closest to an object in the front unit, and a second subunit having a positive power, and
wherein the following inequalities are satisfied:

$0.20 \leq f1a/f1 \leq 0.42$; and $0.61 \leq |f3/f2| \leq 0.90$;

where f1, f2, f3, and f1A are focal lengths of the front unit, the intermediate unit, the rear unit, and the first subunit for d-line, respectively.

2. The stereoscopic optical systems according to claim 1, wherein the intermediate unit includes reflective elements having the reflective surfaces at a position closest to the object and at a position closest to an image plane.

3. The stereoscopic optical systems according to claim 1, wherein each of the intermediate unit and the rear unit has a positive refractive power.

4. The stereoscopic optical systems according to claim 1, wherein the following inequality is satisfied:

$-1.95 \leq f1B/f1 \leq -1.10$;

wherein f1B is a focal length of the second subunit for the d-line.

5. The stereoscopic optical systems according to claim 1, wherein the intermediate unit has a positive refractive power, and the following inequality is satisfied:

$6.10 \leq f2/f \leq 10.90$;

where f is a focal length of each of the two optical systems for the d-line.

6. The stereoscopic optical systems according to claim 1, wherein the rear unit has a positive refractive power, and the following inequality is satisfied:

$4.40 \leq f3/f \leq 9.60$;

where f is a focal length of each of the two optical systems for the d-line.

7. The stereoscopic optical systems according to claim 1, wherein the following inequality is satisfied:

$0.05 \leq Dout/Din \leq 0.50$;

where Din is a distance between the optical axes of the front units in the two optical systems, and Dout is a distance between the optical axes of the rear units in the two optical systems.

8. The stereoscopic optical systems according to claim 1, wherein the following inequality is satisfied:

$1.80 \leq N1Ave \leq 2.20$;

where N1Aave is an average of refractive indexes of one or more negative lenses included in the first subunit for the d-line.

9. The stereoscopic optical systems according to claim 1, wherein the following inequality is satisfied:

$1.78 \leq N1Bp \leq 2.20$;

where N1Bp is a refractive index of a positive lens having the strongest refractive power among one or more positive lenses included in the second subunit for the d-line.

10. The stereoscopic optical systems according to claim 1, wherein the following inequality is satisfied:

$85.0° \leq \omega \leq 120.0°$;

where ω is a half angle of view of each of the two optical systems.

11. The stereoscopic optical systems according to claim 1, wherein the following inequality is satisfied:

$$2.00 \leq Fno \leq 4.50;$$

where Fno is an F-number of each of the two optical systems.

12. The stereoscopic optical systems according to claim 1, wherein the intermediate unit includes a lens between the two reflective surfaces.

13. The stereoscopic optical systems according to claim 1, wherein the intermediate unit includes a diaphragm between the two reflective surfaces.

14. An image pickup apparatus comprising:
- a stereoscopic optical system comprising two optical systems arranged in parallel; and
- an image sensor configured to image optical images formed by the two optical systems,
- wherein each of the two optical systems includes, in order from an object side to an image side, a front unit having a negative refractive power, an intermediate unit having two reflective surfaces, and a rear unit,
- wherein a distance between optical axes of rear units is smaller than a distance between optical axes of front units in the two optical systems due to bending of an optical path by the two reflective surfaces,
- wherein at least one of the intermediate unit and the rear unit has a positive refractive power,
- wherein the front unit includes, in order from the object side to the image side, a first subunit consisting of one or more negative lenses disposed on the object side of a positive lens closest to an object in the front unit, and a second subunit having a positive power, and
- wherein the following inequalities are satisfied:

$$0.20 \leq f1A/f1 \leq 0.42; \text{ and}$$

$$0.61 \leq |f3/f2| \leq 0.90;$$

where f1, f2, f3, and f1A are focal lengths of the front unit, the intermediate unit, the rear unit, and the first subunit for d-line, respectively.

15. The image pickup apparatus according to claim 14, wherein the two optical systems form the optical images within a single image sensor.

* * * * *